United States Patent

[11] 3,586,445

[72] Inventor James Henry Martin, Jr.
    Waynesboro, Va.
[21] Appl. No. 810,237
[22] Filed Mar. 25, 1969
[45] Patented June 22, 1971
[73] Assignee E. I. du Pont de Nemours and Company
    Wilmington, Del.

[54] APPARATUS FOR MONITORING THE WIDTH OF A RUNNING WEB AND INDICATING THE AMOUNTS OF LENGTH WHICH ARE OVER WIDTH, UNDER WIDTH, AND AVERAGE WIDTH
2 Claims, 7 Drawing Figs.

[52] U.S. Cl. .................................... 356/159,
    240/214, 250/219, 356/199
[51] Int. Cl. ..................................... G01b 11/04,
    G01n 21/30, H01j 39/12
[50] Field of Search ........................... 250/219 S,
    219 WD, 214, 219 WE; 356/159, 199

[56] References Cited
    UNITED STATES PATENTS
3,030,853  4/1962  Strother .................. 356/199
3,486,828  12/1969  Nickell et al. ............ 356/199

Primary Examiner—James W. Lawrence
Assistant Examiner—T. N. Grigsby
Attorney—Howard P. West, Jr.

ABSTRACT: A web width monitor which includes a long-line infrared light source located on one side of a running web and parallel to the width dimension to be monitored, a primary photodetector arranged on the opposite side of the web, and a motion detector and pulse former arranged to provide electrical control signals related to length of web motion. A reference photodetector is connected in series with the primary photodetector device and arranged to minimize signal drift due to ambient and circuit operating temperature changes. A first subcircuit linearizes the width indicating photo signal and impresses it on a meter and recorder. This first subcircuit is also connected to a signal integrator circuit arranged to provide counter signal pulses at a recurring rate proportional to tow width. These signals are impressed on a decade counter for a timed interval regulated by a timer device. This provides a readout of integrated average tow width over the time interval. The first subcircuit is, in addition, arranged to furnish analog width signals to a width level detector circuit which is arranged to gate a counter power circuit which in turn is connected to the web motion detector. The counter power circuit is separately gated to two decade counters, one arranged to indicate web length which has greater than a specified width and the other length of web having less than a predetermined width. Each counter is connected to a trip and hold alarm circuit which is actuated when that counter reaches a preselected level.

INVENTOR
JAMES HENRY MARTIN JR.

BY Howard P. West Jr.
ATTORNEY

INVENTOR
JAMES HENRY MARTIN JR.

BY Howard P. West Jr.
ATTORNEY

INVENTOR
JAMES HENRY MARTIN JR.

BY Howard P. West Jr
ATTORNEY

3,586,445

APPARATUS FOR MONITORING THE WIDTH OF A RUNNING WEB AND INDICATING THE AMOUNTS OF LENGTH WHICH ARE OVER WIDTH, UNDER WIDTH, AND AVERAGE WIDTH

BACKGROUND OF THE INVENTION

This invention concerns textile web processing, particularly, apparatus for monitoring variations in the width of a moving web such as a textile tow, computing the average width, and at the same time computing the length of web having widths over a specified maximum and length having widths under a specified minimum all in a preselected total length and furnishing warning light indication or digital readout.

Apparatus to monitor width variations of a moving web have taken several forms in the past. Some used feelers in contact with the web edges, others used multiple light source-photodetector assemblies connected to digital logic and readout circuitry. Still others employ photoelectric detectors with servo mechanisms to follow edge variations and transducers to provide readout. These have not been found satisfactory since they either damage the product in the measuring process or they are excessively complex, costly and difficult to maintain.

SUMMARY OF THE INVENTION

The present invention provides an apparatus for monitoring variations in width of a continuously moving web and for furnishing indications of instantaneous web width, average width after a preset time and length of web having widths greater than and less than preselected high and low values. The apparatus includes a source of light positioned on one side of the web, a photodetector positioned on the other side of the web to receive light from the source as modified by the width of the web. The photodetector produces a first signal having an amplitude that varies in accordance with the width of the web. A motion detector is coupled to the web and produces a plurality of second signals related to the length of web motion. A width level detector circuit is connected to the photodetector through a circuit for linearizing the first signal for producing an output signal corresponding to variations in web width above or below preselected values. An indicating means actuated by the output signal from the width level circuit and the plurality of second signals from the web motion detector furnishes information as to the length of web having a width above or below preselected values.

The apparatus also comprises elements for furnishing indications of average web width for a timed interval. These elements include an integrator circuit connected electrically to the photodetector also actuated by the linearized first signal. The integrator circuit produces pulses at a rate proportional to web width which are fed to a counter. A timing device which may be manually or automatically started and reset simultaneously energizes the integration circuit and the counter for operation for a timed interval.

DESCRIPTION OF THE ILLUSTRATED EMBODIMENTS

Figure 1:
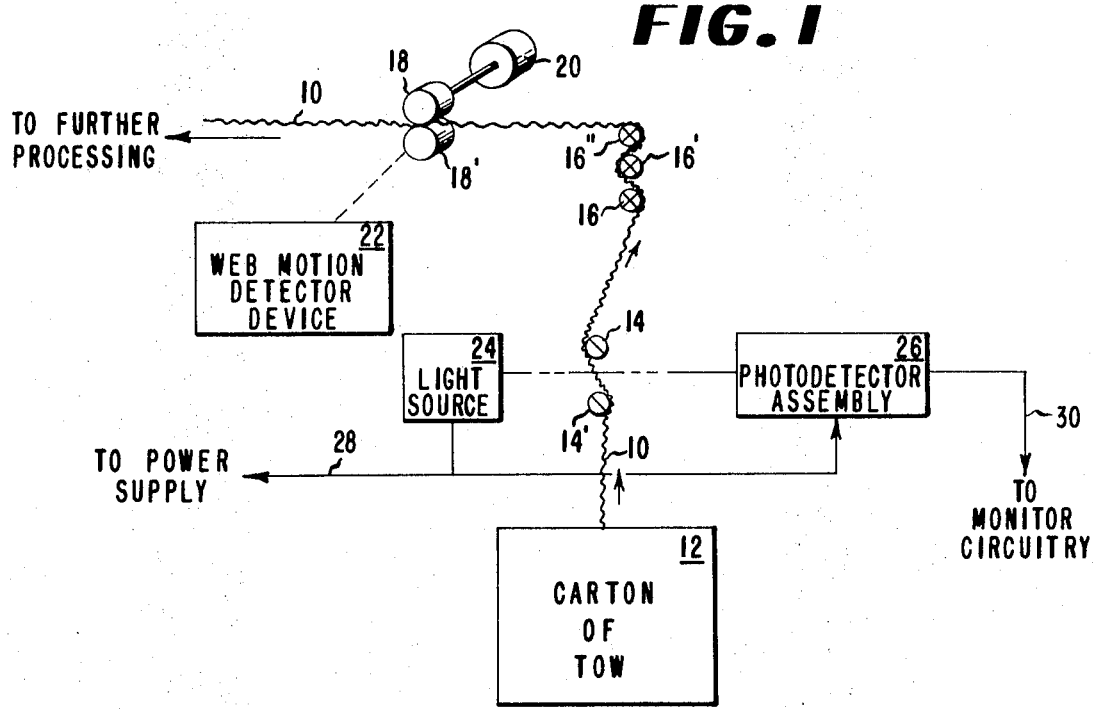
FIG. 1 is a partly schematic elevational view of the arrangement of the light source and photodetector of this invention in association with a device for withdrawing tow from a carton and transferring it to a further processing device such as a Turbo Stapler.

In FIG. 1 the invention is shown in association with apparatus for removing textile tow from a carton and transporting it to further processing steps. In this embodiment tow 10 is removed from carton 12 and passed between straight guides 14, 14' and then successively through three, cascaded, curved guides 16, 16', and 16'' by means of pull rolls 18, 18'. One of the pull rolls is driven by a conventional motor drive 20. A web motion detector device 22 is associated with the other pull roll 18' in order to provide signals related to the length of web moved through the pull rolls. A long line light source 24 is located in a horizontal plane behind guides 14, 14'. A photodetector assembly 26 is located on the other side of tow 10 in the same horizontal plane as the light source and arranged to receive light passing around the tow. Source 24 and photodetector assembly 26 are so located relative to the tow that the tow is closer to the source than detector by a factor of 15 or 20 to reduce signal distortion caused by lateral movement of the tow. A first cable 28 is connected to a voltage regulated power supply for the light source 24 and photodetector assembly 26 and the second cable 30 extends from the photodetector assembly 26 to electronic circuitry to be described below.

Figure 2:
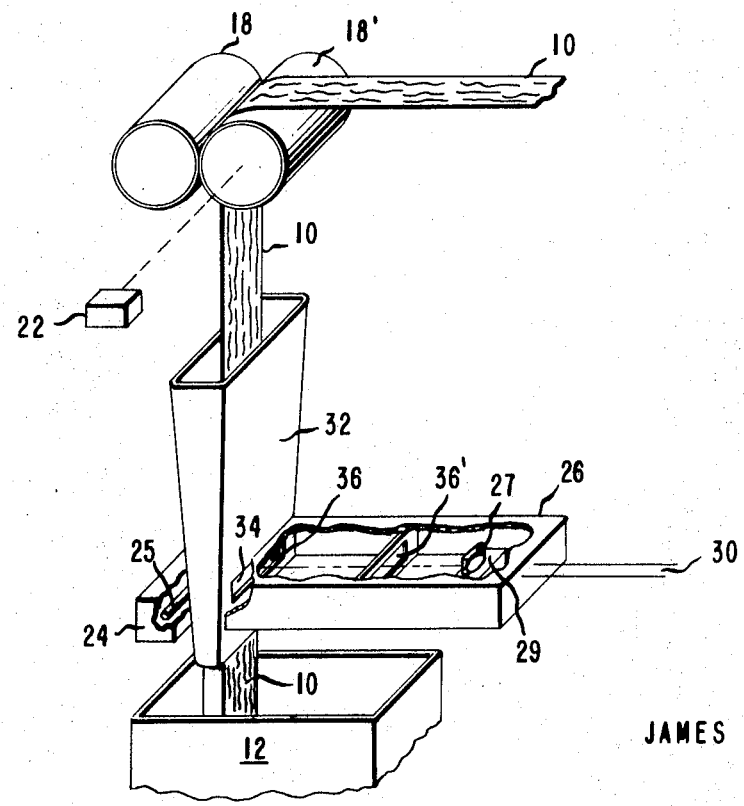
FIG. 2 is a similar elevational view of the invention associated with a carton filling device such as that used just beyond the exit of a tow dryer.

Another embodiment, shown in FIG. 2, comprises pull rolls 18, 18' arranged to withdraw a textile tow 10 from a processing apparatus such as a dryer and send it to a carton 12 through a filling spout 32. Motor 20 (not shown) serves to drive roll 18. Web motion detector 22 is arranged to provide signals indicative of web length moved by rolls 18, 18'. A light source 24 containing a long line bulb 25 is located on one side of spout 32 in a horizontal plane aligned with opposing slots 34 in spout 32 and slots, 36, 36', in photodetector assembly 26. A photodetector 27, located inside assembly 26, has output lines 30 connected to electronic circuitry to be shown and described below. Since in this embodiment scanned width angle changes and lateral motion of the tow is very slight, the ratio of tow to detector and tow to source distances is reduced to about 5 or 6.

Figure 3:
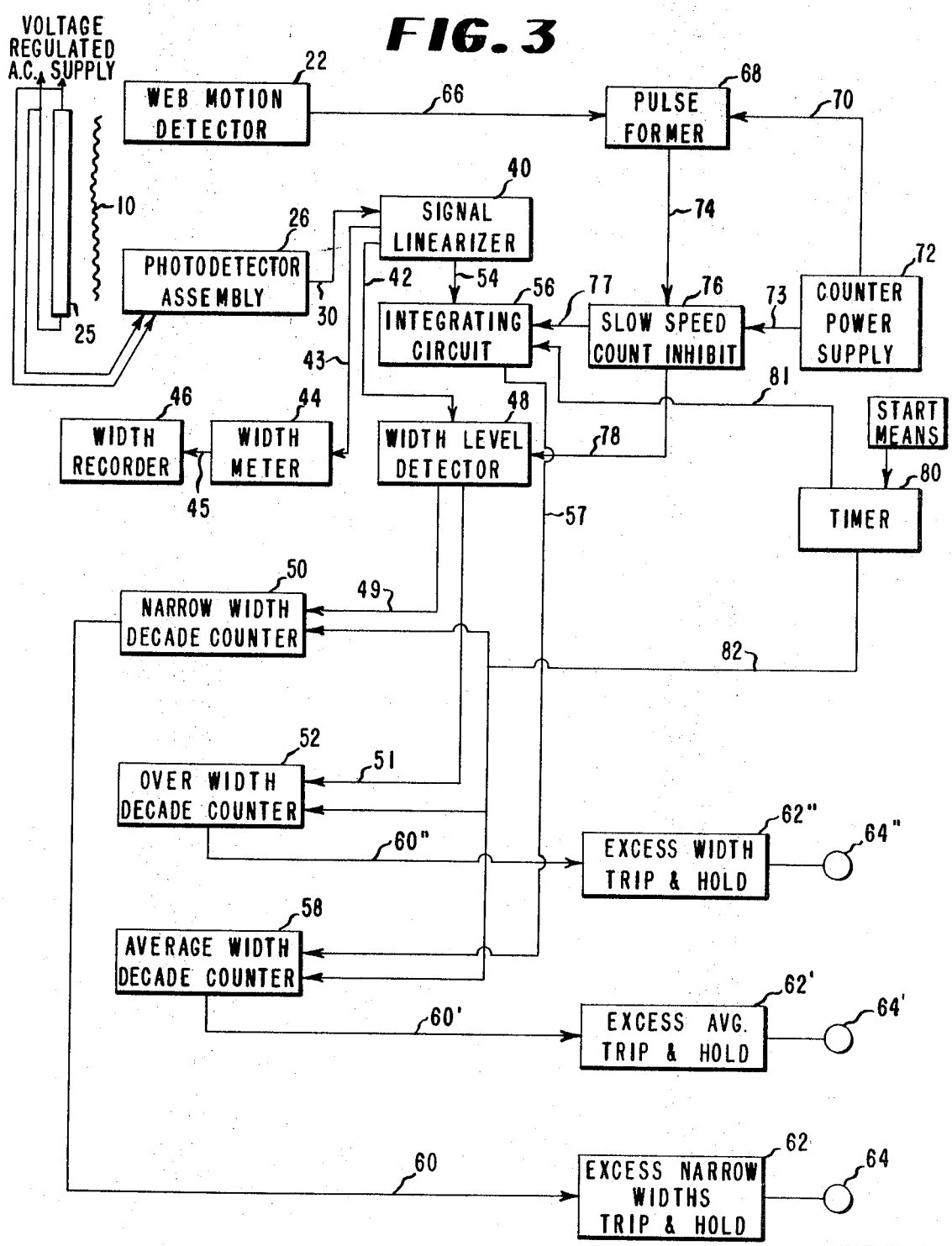
FIG. 3 is a schematic sketch and block diagram of one preferred embodiment showing the illuminator, photodetector, and electronic signal processing circuit components.

Turning now to FIG. 3, the component arrangement, particularly the block diagram of the electronic components, is shown which is applicable to either of the embodiments shown in FIGS. 1 and 2. The light source lamp 25 (which may be a General Electric type 1000T3 quartz heat lamp) is arranged on one side of the moving tow 10 and a photodetector assembly 26 on the opposite side of the tow. The components are aligned so detector 27 (FIG. 2) receives light passing around the tow. Output from the photodetector circuit 29 (FIG. 2) is connected over cable 30 to a signal linearizer 40. The output of circuit 40 is brought out over three cables 42, 43 and 54. Cable 43 leads to width meter 44 and thence over cable 45 to a width recorder 46 which is optional in these embodiments. Cable 42 leads to a width level detector 48 which is connected over cable 49 to narrow width decade counter 50 and over cable 51 to over width decade counter 52. The third output from circuit 40 is impressed over cable 54 on integrating circuit 56, the output of which is taken over cable 57 to the average width decade counter 58. Each counter 50, 52, 58 is connected over an associated cable 60, 6' or 60'' to trip and hold circuits 62, 62', and 62'' and thence to appropriate signalling lamps 64, 64' and 64''.

Web motion detector 22 is coupled, as shown in FIGS. 1 and 2, with the pull rolls moving the tow 10. It provides an output connected over cable 66 to pulse former 68 which is also connected, over cable 70, to counter power supply 72. Output from pulse former 68 is connected through cable 74 to slow speed counter inhibit circuit 76. One output signal from circuit 76 is connected over cable 78 to tow width level detector circuit 48. Circuit 76 receives counter power signal over cable 73 and gates it to integrating circuit 56 over cable 77. A timer 80 is connected over cable 81 to integrating circuit 56 and over cable 82 to reset terminals of counters 50, 52, 58.

Web motion detector 22 of FIGS. 1, 2 and 3 is constructed in a fairly conventional manner as follows. A signal wheel is made of a rigid plastic and mounted on a shaft of one of the pull rolls such as roll 18' of FIGS. 1 and 2. This signal wheel has at least one section of metallic tape fastened to its periphery. A proximity switch is mounted with its sensor close to the signal wheel. An amplifier and relay are connected to the sensor to complete the structure of detector 22. The following Minneapolis Honeywell components are used: Sensor-Catalog No. 205FS1; Amplifier-Catalog No. 40FL1; and Mercury Relay-Catalog No. 3FD2.

Pulse former circuit component 68 comprises a conventional one shot multivibrator. Likewise counters 50, 52 and 58 are conventional apparatus comprising Durant Unipulsers-Catalog No. 49400–405 of the Durant Manufacturing Co. Circuit 76 is a transistorized pulse frequency circuit arranged to energize a relay coil when the count repetition rate received through the pulse former 68 from web motion detector 22 exceeds a preselected level. The contacts of this relay are in series with the lines coming from cables 73 originating in the counter power supply and going to cable 77 furnishing counter power to the integrating circuit 56 and also to a second relay contained within circuit 76 which controls the contacts at a repetition rate according to signals coming from pulse former 68 over cable 74. Thus, over cable 77 there is a steady signal developed by the counter power supply 72 whenever normal web speeds prevail. Cable 78 however carries a pulsed signal which is the signal developed by the counter power supply 72 gated and therefore pulsed at recurring times controlled by the pulses from the web motion detector 22 also whenever normal web speeds prevail.

Figure 4:
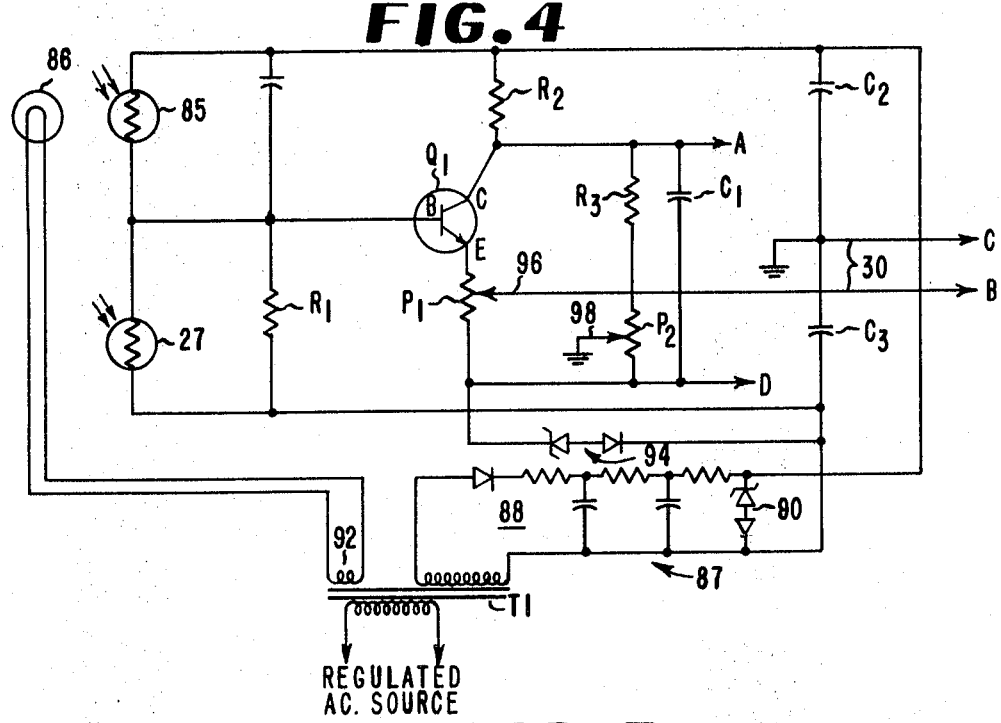
FIG. 4 is a circuit diagram of the photodetector circuit.

Turning now to FIG. 4, details of photodetector circuit 29 will be described. It is seen to comprise basically, first, a pair of photoresistive photocells 85, 27 arranged in a voltage divider circuit. In some embodiments resistor $R_1$ is connected in parallel with photocell 27, the active cell, in order to provide reduced current variation and thus to give additional temperature compensation for large changes in active photocell resistance. An emitter follower circuit, employing transistor $Q_1$, reduces the circuit impedance for transmission of signals to the further electronic control circuitry. This circuit is located within photodetector assembly 26 of FIGS. 1 and 2 with the active photocell 27 positioned, for example, as shown in FIG. 2 to receive light from a light source 24 passing around moving tow 10. Reference photocell 85 is placed inside a light tight portion of assembly 26 along with a lamp 86. Cells 27, 85 are placed in series across a regulated DC power supply 87 comprising a regulated AC source, a transformer $T_1$, and rectifier with filtering array 88 having connected across it a temperature compensated Zener diode DC voltage regulator arrangement 90. An extra secondary winding 92 of transformer $T_1$ is employed to energize lamp 86. Base, B, of transistor $Q_1$ is connected to the midpoint between cells 27, 85. Resistor $R_1$ if used, is connected in parallel with cell 27. The collector C of transistor $Q_1$ is connected through resistor $R_2$ to the positive side of DC supply 87. The emitter E of transistor $Q_1$ is connected through potentiometer $P_1$ in series with a second Zener diode combination 94 to the negative side of supply 87. The series combination of a resistor $R_3$ and potentiometer $P_2$ is connected between the collector C of transistor $Q_1$ and the common terminal of the potentiometer $P_1$ and diode combination 94. A capacitor $C_1$ is connected in parallel with the series combination $R_3$, $P_2$. Capacitors $C_2$, $C_3$ are connected in series across the output terminals of DC power supply 87. The movable contact 96 of potentiometer $P_1$ is connected to one line of cable 30 whereas the other line is connected to ground and to the midpoint between capacitors $C_2$, $C_3$. The movable contact of potentiometer $P_2$ is also connected to ground. Power supply 87 is not grounded but is floated so the zero potentiometer $P_2$ can be used to bring the signal from contact 96 over cable 30 out relative to ground level. Movable contact 98 on potentiometer $P_2$ provides signal zero adjustment whereas contact 96 on potentiometer $P_1$ provides signal gain adjustment. Thus the output from photocell circuit over cable 30 is impressed as input on the linearizer circuit 40 of FIG. 5.

Circuit 40 is seen to comprise basically transistor $Q_2$ operating as a second emitter follower and the combination of resistors $R_4$, potentiometers $P_3$ and $P_4$ arranged to provide, at junction 102, an analog signal which is linear with respect to the width of the tow being monitored. Connected also to this junction through appropriate calibrating resistors and potentiometer are width meter 44 and the optional width recorder 46.

Figure 5:
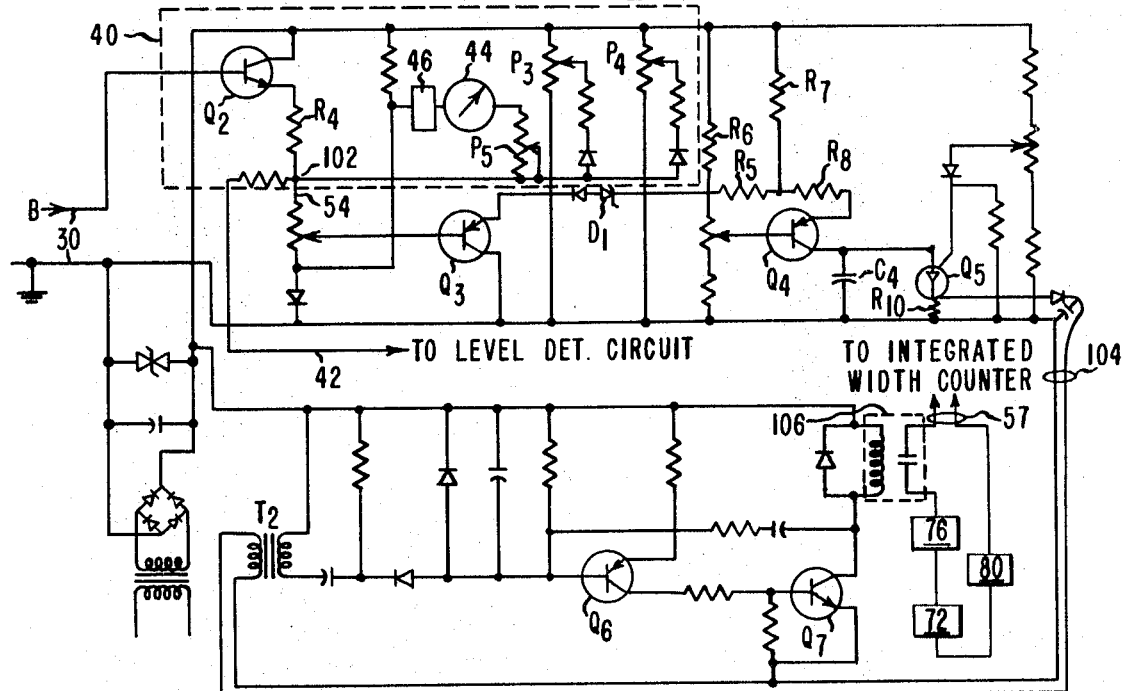
FIG. 5 is a circuit diagram showing the signal linearizing and integrating circuits.

The integrator circuit portion of FIG. 5 is seen to include transistor $Q_3$, operating as an additional inverted emitter follower which, through offset Zener diode D, and current source transistor $Q_4$, serves to feed capacitor $C_4$ with rising current signals proportional to width of the tow being monitored. Programmable Unijunction Transistor (PUT) $Q_5$ and resistor $R_{10}$ are connected across capacitor $C_4$. Cable 104 is connected across resistor $R_{10}$ and then through a blocking diode to the primary of pulse transformer $T_2$. The secondary of transformer $T_2$ is connected to a one shot multivibrator comprising transistors $Q_6$ and $Q_7$. Output of this circuit is passed through the coil of relay 106, the contacts of which are in series with counter power supply 72, slow speed count inhibit contacts in circuit 76 and integration time period enable contacts in timer circuit 80 via cable 81 (FIG. 3).

Figure 6:
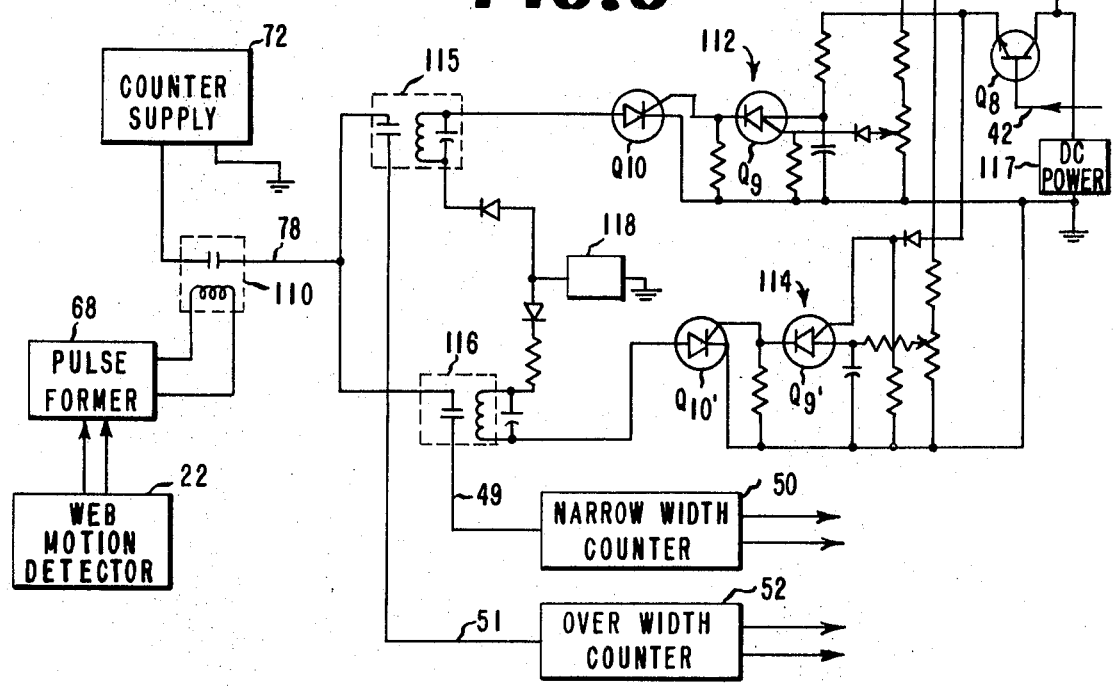
FIG. 6 is a circuit diagram of the width level detector component.

Details of the width level detector 48 are now described by reference to FIG. 6. Input signals for this circuit are received over cable 42 from circuit 40 in the form of analog tow width signals. This input is impressed on emitter follower transistor $Q_8$ the output of which is simultaneously impressed on the two level detector circuits 112, 114. The former is the over width detector component and the latter the under width detector components. These level detector circuits 112, 114 each include a PUT semiconductor device $Q_9$, $Q_9'$ which serves to gate SCR's $Q_{10}$, $Q_{10}'$ which are connected in turn to relays 115, 116. DC power supply 117, and AC supply 118 furnish power to these circuits. The contacts of relay 115 are located in the one side of cable 51 which connects to the over width decade counter 52. The contacts of relay 116 are similarly located in one line of cable 49 which extends to the narrow width decade counter 50.

Figure 7:
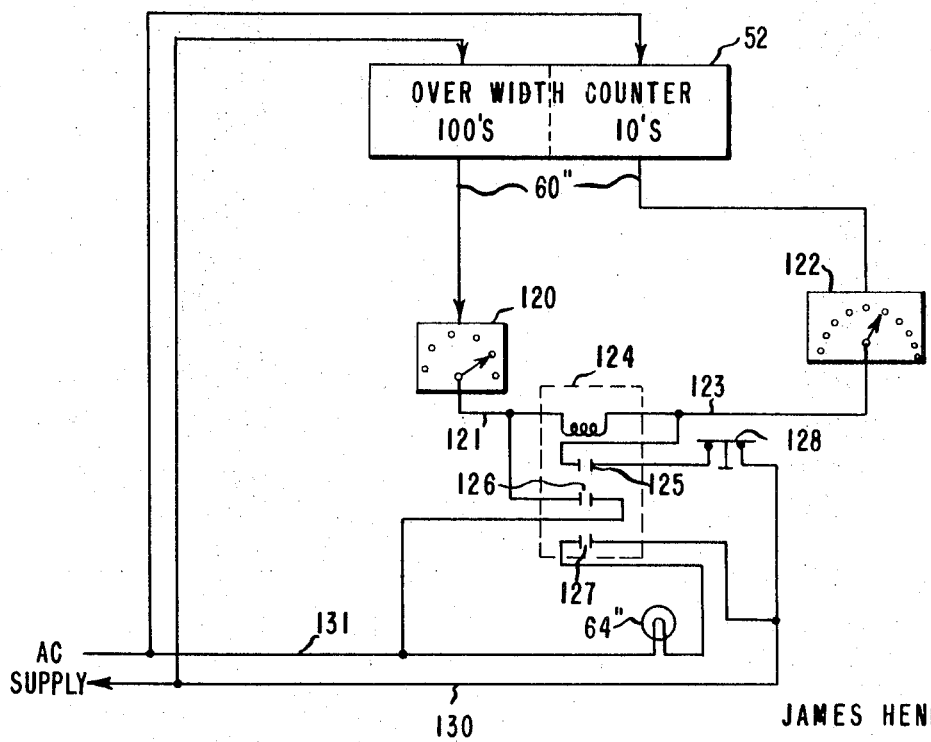
FIG. 7 is a typical trip and hold alarm circuit diagram.

A representative trip and hold alarm circuit is shown in FIG. 7 which is typical of the three circuits each connected to a decade counter 50, 52, 58. In this circuit of FIG. 7 one side of an AC power supply is connected to one decade portion, for example, the hundreds portion of counter 52 whereas the other side of this AC supply is connected to the other, the tens decade. A compound cable 60" containing sufficient lines to contact the desired number of digits in each of the decades is brought out from the counter 52. The part from the first decade goes to a first thumb switch selector 120, the output of which extends over line 121 to one side of the coil of relay 124. The other part of cable 60" extends to a second thumb switch selector, 122 the output of which extends over line 123 to the other side of the coil of relay 124. Three sets of relay contacts 125, 126, 127 are associated with relay 124. The first set of contacts 125 is connected between line 123 through a normally closed pushbutton switch 128 to the hot side of an AC power supply line. The second set of contacts 126 extend from line 121 to the neutral side of the AC supply. The third set of contacts 127 connect from the hot line 130 through a lamp 64" to the neutral line 131 of the AC supply.

In operation the device of this invention serves to continuously monitor the width of a moving tow such as 10 in FIGS. 1 and 2 as it is proceeding either, for example, from an operation step into a carton or from a carton to a further operating step. The device is so constructed and arranged as to provide three separate indices of tow width character: first, an indication of the average width over a preselected interval of time; second, the length of tow which has widths greater than a preselected value; and finally, the length of tow that has widths less than a preselected minimum. In order to do this, the signal generated by the photodetector circuit is made a linear function of width by means of the signal linearizer 40 of FIG. 3. The output from circuit 40 as a function of width is determined first by the selection of the various resistors in FIG. 5 such as $R_4$ and secondly by adjustment of potentiometers $P_3$, $P_4$, and $P_5$. This calibration adjustment is accomplished by means of standard tow samples of known different widths which are placed in the apparatus in place of the moving tow 10 in order to provide signals for adjustment of linearity of output signal. The analog width signal goes not only to provide readout of width variations on meter 44 and recorder 46 but also is impressed on width level detector 48. The operation of this detector is understood by reference to FIG. 6. If the incoming signal received over line 42 is greater than that for the maximum allowable acceptable width, the signal will fire transistor $Q_9$ which in turn will cause SCR $Q_{10}$ to become conducting and draw power from AC supply 118 through the coil of relay 115 closing the contact in this relay. This action allows pulses of power from power supply 72 as gated by the pulseformer 68 actuated by the web motion detector 22 to be conducted to the over-width decade counter 52. In this way, as long as the tow width is greater than the acceptable upper limit, the counter 52 will count the length of tow having this excess range of width. Similarly the subcircuit 114 provides counts in counter 50 for those lengths of tow having less than a minimum width value.

At the same time circuit 40 also passes a signal to the integrator circuit 56, the operation of which is understood by reference to FIG. 5. The rising voltage proportional to the magnitude of width is received over line 54 and applied to the base of inverted emitter follower transistor $Q_3$ which, with the Zener diode $D_1$, references this signal near the value of the power supply line. An emitter follower load resistor $R_8$ from transistor $Q_4$ connects to the $Q_3$ signal divider resistors $R_5$ and $R_7$. With fixed voltage on the $Q_4$ base the emitter applied signal modulates $Q_4$ current directly as required. Thus $Q_4$ is a constant current source (independent of load impedance on $Q_4$'s collector) which supplies charging current via its collector to the integrating capacitor $C_4$. This modulation gives the capacitor a charging current proportional to width. Each time capacitor $C_4$ reaches the firing voltage, $Q_5$ becomes conductive and rapidly discharges the capacitor through the resistor $R_{10}$. The voltage drop in resistor $R_{10}$ is coupled through the transformer $T_2$ to the one-shot multivibrator comprising $Q_6$ and $Q_7$ and energizes the relay coil closing the contacts of relay 106. In this way power from counter power supply 72 is gated to decade counter 58 at a repetition rate proportional to tow width passing through the device. Timer 80 operating over line 81 actuates this integrating process at the beginning of a specified length of time at the end of which it terminates the integration. Timer 80 also serves to reset but not start itself at the end of a measuring time interval. Tests of standardized lengths of tow are initiated by an automatic or manual start momentary poser signal fed into the timer circuit 80. This signal resets all decade counters to zero and initiates the timer motor which operates only during normal tow speeds.

The operation of the trip and hold circuits, which are provided to light indicator or alarm lamps, can be understood by reference to FIG. 7. If, for example, thumb switch 120 is set at the value four, meaning 400 counts in the over-width decade counter 52 and thumb switch 122 is set as shown at five, meaning 5 counts in the tens register of counter 52, the trip portion is set for operation at a counter value of 450. Thus when counter 52 reaches a count equal to 450, current is allowed to pass from the hot side of the AC line through the 100's register and through switch 120 over line 121, through the coil of relay 124 and return through line 123 and switch 122 to the 10's register and thence to the neutral side of the AC power supply. Coil of relay 124 closes contacts 125, 126 and 127. Contacts 125, 126 provide the hold feature in that, once the coil of relay 124 and lamp 64 (through contacts 127) are energized, power is continuously maintained from line 131 through the coil of relay 124, lamp 64 and back to line 130. Relay contacts 125, 126, 127 are held closed until pushbutton switch 128 is opened or power is otherwise interrupted. This deenergizes the relay 124 coil and serves to reset the trip and hold circuit. Of course, the relay will not reset while the counter total remains on the 45 digits in the 450 count.

Thus this invention serves to monitor variations, over standardized test lengths, in the width of a running web and furnish indications of instantaneous width, average width after a preset time, and lengths of web having widths greater than and less than preselected high and low limits.

Width monitoring of textile tow has been found important from two standpoints. It provides a quick and reliable indicator of processing upsets such as, for example, in drawing, percentage finish or extent of crimp. Furthermore it provides a means for eliminating tow which has width variations that might cause difficulties in further processing such as in a Turbo Stapler, particularly when several ends of two are combined in a creel.

This invention has been described in connection with two applications related to monitoring the width of textile tow as it is continuously transported. Modification obvious to one skilled in the art may be made to apply the principles of this invention to the monitoring of width of other types of webs or dimensions of other moving material. In one embodiment the comparison or level detecting circuits of FIG. 6 were replaced with a meter-relay. The embodiments described show the use of three digital counter devices to provide readout for three width parameters. They could easily be modified to provide printout at the end of a standard length test. Elimination of one or more of these counters is within the scope of this invention. For example, in one modification the narrow width decade counter 50 was eliminated and relay 116 of FIG. 6 was arranged to connect an AC supply to an indicator lamp rather than the arrangement as shown. Furthermore, solid-state components could be used to eliminate many relays. Other modifications and embodiments will be apparent to one skilled in the art.

What I claim is:

1. An apparatus for monitoring variations in width of a continuously moving web and for furnishing indications of length of web having widths above or below a preselected value and average web width for a timed interval comprising: a source of light positioned on one side of said web; a photodetector positioned on the other side of the web to receive light from said source as modified by the width of the web and to produce a first signal the amplitude of which varies in accordance with the width of the web; a motion detector coupled to the web for producing a second signal related to length of web motion; width level circuit means connected electrically to said photodetector and actuated by said first signal for producing an output signal corresponding to variations in web width above or below preselected values; means electrically connected to said motion detector and said width level circuit and actuated by said output signal and said second signal for indicating the length of web having a width above or below the preselected values; integrator circuit means connected electrically to said photodetector and actuated by said first signal, said integrator circuit having components for providing pulses at a rate proportional to the width of the web; a counter connected to said integrator circuit means and actuated by said pulses; and means for simultaneously energizing the integrator circuit means and the counter for a timed interval.

2. The apparatus of as defined in claim 1, said components comprising: a constant current source connected electrically to said photodetector, said source being modulated by said first signal; a capacitor electrically connected in parallel with said source, said capacitor being charged by said current source, and means connected in parallel with said capacitor for discharging said capacitor whenever its charge reaches a preset level and for generating repetitive switch actuating signals at a repetition rate proportional to web width.